(12) United States Patent
Fujii et al.

(10) Patent No.: US 7,561,773 B2
(45) Date of Patent: Jul. 14, 2009

(54) OPTICAL WAVEGUIDE, METHOD OF MANUFACTURING THE SAME AND OPTICAL COMMUNICATION MODULE

(75) Inventors: Akira Fujii, Kanagawa (JP); Toshihiko Suzuki, Kanagawa (JP); Keishi Shimizu, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 132 days.

(21) Appl. No.: 11/605,391

(22) Filed: Nov. 29, 2006

(65) Prior Publication Data
US 2007/0292091 A1 Dec. 20, 2007

(30) Foreign Application Priority Data
Jun. 19, 2006 (JP) ............................. 2006-168983
Jun. 19, 2006 (JP) ............................. 2006-168984

(51) Int. Cl.
*G02B 6/10* (2006.01)
(52) U.S. Cl. ..................... 385/129; 385/130; 385/131; 385/132
(58) Field of Classification Search ...................... None
See application file for complete search history.

(56) References Cited

U.S. PATENT DOCUMENTS

| 5,210,801 | A  | * | 5/1993 | Fournier et al. ............... 385/14 |
| 5,917,625 | A  | * | 6/1999 | Ogusu et al. .................... 385/24 |
| 6,558,585 | B1 | * | 5/2003 | Zhang et al. .................. 264/1.27 |
| 2004/0146257 | A1 | * | 7/2004 | Parker et al. ................. 385/123 |
| 2004/0197064 | A1 | * | 10/2004 | Kawamonzen et al. ....... 385/129 |

FOREIGN PATENT DOCUMENTS

| JP | A 06-088915 | 3/1994 |
| JP | A 2001-311846 | 11/2001 |
| JP | A 2004-029507 | 1/2004 |
| JP | A 2004-086144 | 3/2004 |
| JP | A 2004-109927 | 4/2004 |

\* cited by examiner

*Primary Examiner*—Uyen Chau N Le
*Assistant Examiner*—Chad H Smith
(74) *Attorney, Agent, or Firm*—Oliff & Berridge, Plc

(57) ABSTRACT

An optical waveguide includes: a lower substrate; a waveguide core that is formed on the lower substrate; a clad that is formed to surround a periphery of the waveguide core; and an upper substrate that is opposed to the lower substrate, wherein the waveguide cores, the lower substrate and the upper substrate surround a cavity extended along the waveguide core.

26 Claims, 7 Drawing Sheets

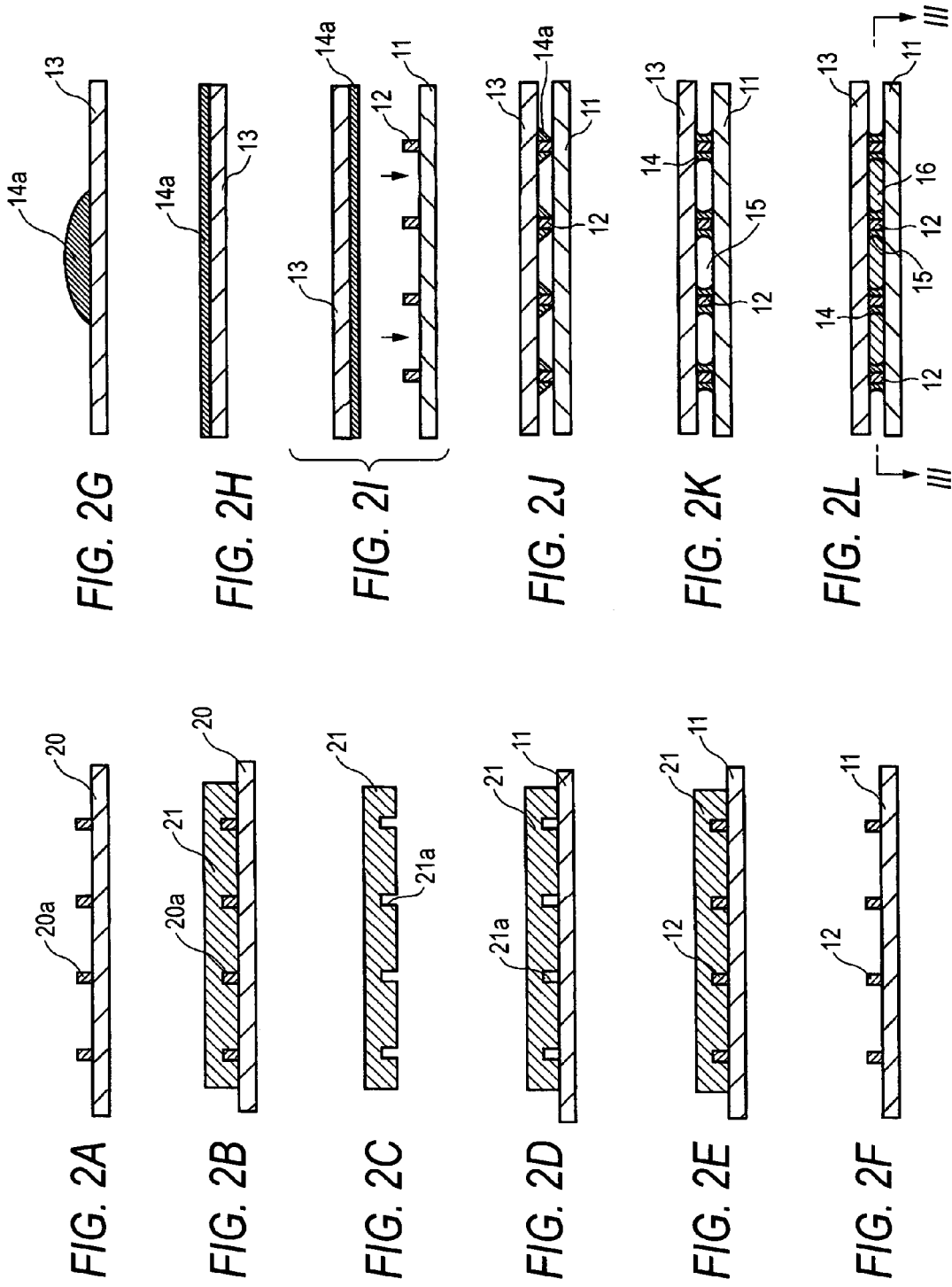

OPTICAL WAVEGUIDE, METHOD OF MANUFACTURING THE SAME AND OPTICAL COMMUNICATION MODULE

BACKGROUND

1. Technical Field

The present invention relates to an optical waveguide and a method of manufacturing the same, and an optical communication module and, more particularly, an optical waveguide and a method of manufacturing the same, and an optical communication module, capable of making sure of a flexibility without change of the material, achieving a weight reduction, being cheap price, improving the manufacturing efficiency by simple method.

2. Related Art

As an example of the method of manufacturing the polymer optical waveguide in the prior art, various manufacturing methods such as (1) the method of impregnating a film with a monomer, exposing selectively a core portion to change a refractive index, and gluing films together (selective polymerization method), (2) the method of coating a core layer and a cladding layer and then forming a cladding portion by using the reactive ion etching (RIE method), (3) the method of exposing/developing an ultraviolet curable resin, which is obtained by adding a photosensitive material into a polymer material, by the photolithography (direct exposure method), (4) the method utilizing the injection molding, (5) the method of coating a core layer and a cladding layer and exposing a core portion to change a refractive index of the core portion (photo bleaching method), and others have been proposed.

However, the selective polymerization method in (1) has a problem with the gluing of the films. The RIE method in (2) and the direct exposure method in (3) need high cost because such methods employ the photolithography. The injection molding method in (4) has a problem about a precision of the resultant core diameter. The photo bleaching method in (5) has such a problem that a difference in refractive indexes between the core layer and the cladding layer cannot be sufficiently ensured. The RIE method in (2) and the direct exposure method in (3) can be listed as the practical manufacturing method, but these methods have a problem with a production cost as described above. All manufacturing methods in (1) to (5) needs a wide area, and are not practically fit for forming the polymer optical waveguide on the flexible plastic substrate.

In addition, when the electric wiring pattern and optical interconnection pattern (core) are manufactured, complicate and many step is needed due to manufacturing by various thin film forming process, for example, patterning, exposure and development, and etching, or so like. Therefore, there are problems that fabrication yield easily gets worse and production cost soars.

SUMMARY

An objection of the present invention is to provide a method of manufacturing an optical waveguide having the electric wire, capable of being cheap cost and improving the manufacturing efficiency by simple method.

(1) According to a first aspect of the present invention, an optical waveguide includes: a lower substrate; a waveguide core that is formed on the lower substrate; a clad that is formed to surround a periphery of the waveguide core; and an upper substrate that is opposed to the lower substrate, wherein the waveguide cores, the lower substrate and the upper substrate surround a cavity extended along the waveguide core.

According to this configuration, when the optical waveguide is bent, a deformation caused due to a distortion, a curvature, etc. can be absorbed and reduced by the cavity, and thus a flexibility of the optical waveguide can be increased irrespective of the material of the optical waveguide. A utility efficiency of materials can be enhanced tremendously, and also a weight reduction of the optical waveguide can be attained.

BRIEF DESCRIPTION OF THE DRAWINGS

Exemplary embodiment of the present invention will be described in detail based on the following figures, wherein:

FIGS. 2A to 2L are process views showing conceptually steps of manufacturing the optical waveguide according to a first embodiment of the present invention;

DETAILED DESCRIPTION

Exemplary embodiments of the present invention will be explained concretely with reference to the accompanying drawings hereinafter.

First Embodiment (Configuration of the Optical Waveguide)

Figure 1:
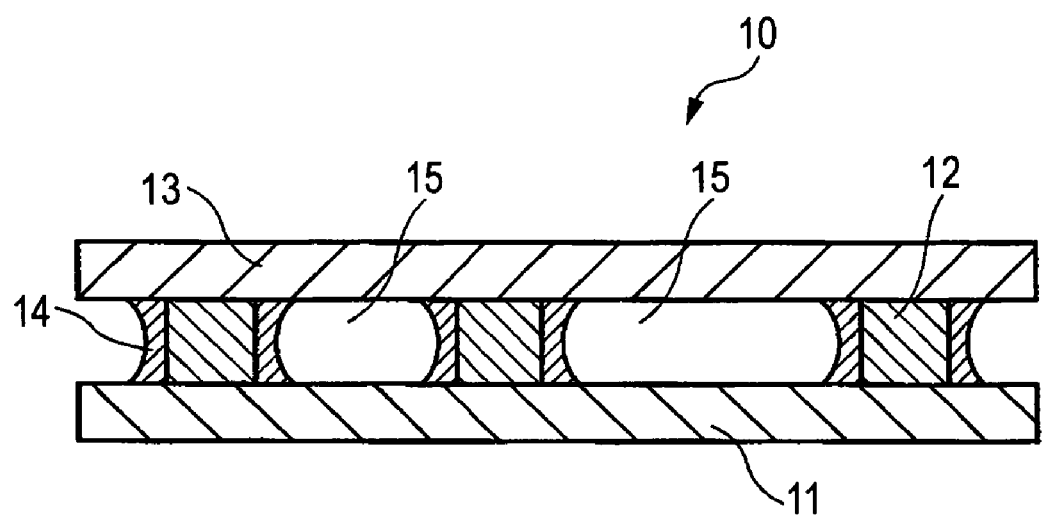
FIG. 1 is a sectional view showing schematically a configurative example of an optical waveguide according to a first embodiment of the present invention.

FIG. 1 is a sectional view showing schematically a configurative example of an optical waveguide according to a first embodiment of the present invention.

In FIG. 1, a reference symbol 10 denotes a configurative example of the optical waveguide. As shown in FIG. 1, a basic configuration of the optical waveguide 10 includes a lower substrate 11 serving as a cladding layer, waveguide cores 12 formed on the lower substrate 11, an upper substrate 13 opposed to the lower substrate 11 to put the waveguide cores 12 between them and serving as a cladding layer, thin film clads 14 formed on side surfaces of the waveguide cores 12 respectively, and cavities 15 formed between the opposing clads 14. The lower substrate 11 and the upper substrate 13 are formed of a film member, a sheet member, or the like, for example, to have a rectangular shape. The waveguide cores 12 and the cavities 15 are formed to have an array structure in which they are arranged at a predetermined array interval mutually. The waveguide cores 12 in this array structure are extended in the light traveling direction at different array intervals mutually. Also, the cavities 15 as a characteristic structure in the first embodiment are formed to pass along the waveguide cores 12 from one end surface to the other end surface in the light traveling direction. A sectional shape of the cavity 15 in this array structure taken perpendicular to the light traveling direction is shaped into a substantially rectangular shape, and a width of the sectional shape is set to a different width dimension respectively. A height of the cavity 15 is substantially equal to a height of the waveguide core 12.

The waveguide core 12 is formed of the material having a high refractive index, and the lower substrate 11 and the upper substrate 13 are formed of the material having a refractive index lower than the waveguide core 12. As the lower substrate 11 and the upper substrate 13, the polymer film substrate that is excellent in optical characteristics such as a refractive index, an optical transmission characteristic, etc., mechanical strength, heat resistance, flexibility, and the like, the substrate on which a cladding layer is coated, or the like, for example, can be employed. As the substrate, various materials such as silicon, glass, ceramics, plastics, and the like can be employed. The substrate, if has a proper refractive index, can be employed as the clad base as it is. If the substrate needs adjustment of the refractive index, the clad base on the overall surface of which the resin coating or inorganic material is deposited by the PVD method, the clad base on the surface of which the resin coating or inorganic material is deposited partially by the PVD method, or the like can be employed as the cladding layer.

In this optical waveguide 10, a structure in which a closing member (reference symbol 16 in FIG. 3) formed of a curable resin is filled into at least one of opening end portions of the cavity 15 can be formed. A refractive index of this curable resin is not limited. Accordingly, the opening end of the cavity 15 is closed by the curable resin that is filled/cured in the opening end portion of the cavity 15, and the inside of the cavity 15 can be shut off from the outside air. The highly reliable flexible optical waveguide 10 that is excellent in the mechanical characteristics, the optical transmission characteristic even under the high temperature and humidity environmental condition can be obtained. Also, a distance between a filling start position and a filling end position of the curable resin that is filled into the inside of the cavity 15 can be set to a different dimension mutually. As a result, a position of the bending portion of the optical waveguide 10 can be adjusted.

It is of course that a structure, a shape, and a constituent member of the optical waveguide 10 constructed as above are not limited to illustrated examples. According to this first embodiment, the waveguide cores 12 are formed at a different array interval mutually and the width of the sectional shape of the cavities 15 is set to the different width dimension mutually. But the present invention is not limited to illustrated examples. In the present invention, for example, the waveguide cores 12 in the array structure can be extended in the light traveling direction at the same array interval and also the width of the cavities 15 in the array structure can be set to the same interval. A shape of the waveguide core 12 can be set appropriately according to a shape of the optical element to which the optical waveguide is optically coupled.

In the optical waveguide 10 as the first embodiment, the peripheral surface of the cavity 15 formed in its inside is not constructed as the side surface of the waveguide core 12. Also, the cavity 15 does not have a function as the clad whose refractive index is 1.0. The cavity 15 of the optical waveguide 10 as the first embodiment has a major feature in the function that absorbs/reduces an excessive deformation of the optical waveguide 10 caused due to a curve, a torsion, etc. The width, etc. of the cavity 15 can be set arbitrarily in response to the request for the flexibility of the optical waveguide 10.

(Method of Manufacturing the Optical Waveguide)

The optical waveguide 10 constructed as above according to the first embodiment is manufactured effectively by the manufacturing method of the present invention shown in FIG. 2 as follows. In the following manufacturing example, the optical waveguide 10 in which the polymer film material rich in flexibility is used in the lower substrate 11 and the upper substrate 13 will be explained, but the present invention is not limited to the polymer film material. Also, in this manufacturing example, the case where the waveguide cores 12 in the array structure are manufactured at the same array interval will be explained, but the case where the waveguide cores 12 in the array structure are manufactured at the mutually different array intervals is also contained.

Figure 3A:
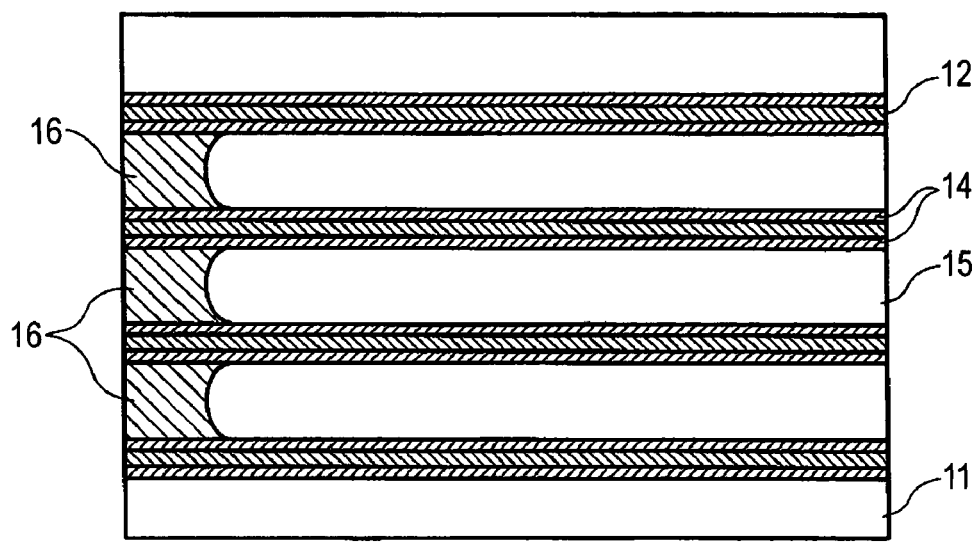
FIG. 3A and FIG. 3B are enlarged sectional views showing a state where a curable resin is filled/cured in an opening end portion of a cavity of the optical waveguide in the present invention, respectively.
Figure 3B:
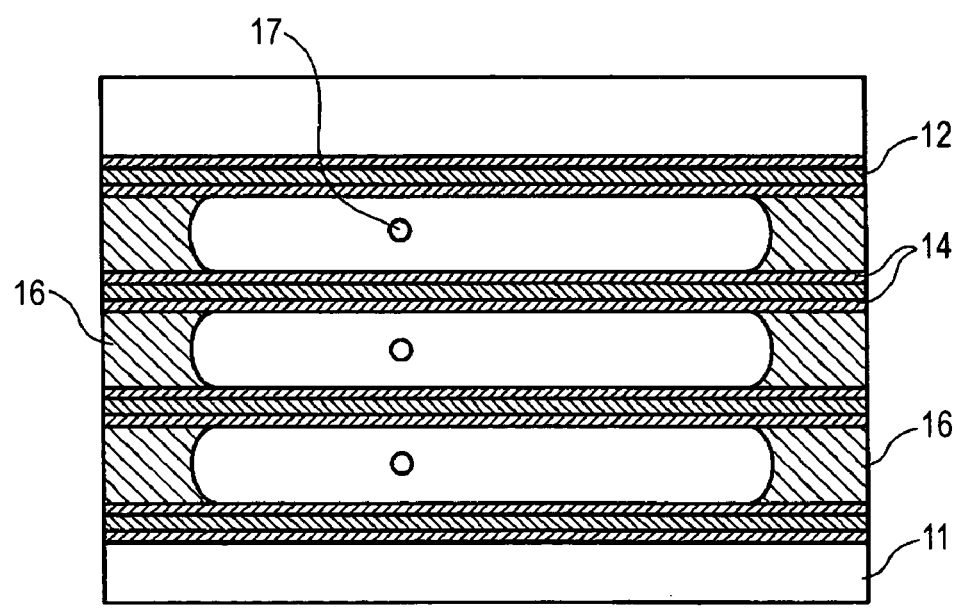

FIGS. 2A to 2L shows conceptually steps of manufacturing the optical waveguide 10. FIG. 2A and FIG. 2B are conceptual views showing the steps of manufacturing a mold 1 used to manufacture the waveguide core, FIG. 2C to FIG. 2F are conceptual views showing the steps of manufacturing the waveguide cores 12, FIG. 2G and FIG. 2H are conceptual views showing the steps of manufacturing the thin film clad 14a, FIG. 2I to FIG. 2K are conceptual views showing the steps of manufacturing the cavities 15 passing along the waveguide cores 12, and FIG. 2L is a conceptual view showing the steps of filling/curing the curable resin 16 in the cavities 15. FIG. 3A and FIG. 3B show states where the curable resin is filled/cured in the opening end portion of the cavity 15 of the optical waveguide 10. FIG. 3A and FIG. 3B are sectional views viewed from a III-III line in FIG. 2L.

(Step of Manufacturing the Mold)

Like the technology to manufacture the mold set forth in JP-A-2004-29507, JP-A-2004-86144 and JP-A-2004-109927 proposed previously by the applicant of this application, a mold 21 shown in FIG. 2C can be manufactured by using a base plate 20 on which projections 20a corresponding to shapes of the waveguide cores are formed. Also, this base plate 20 can be manufactured by the same manufacturing method as the base plate manufacturing technology set forth in JP-A-2004-29507, JP-A-2004-86144 and JP-A-2004-109927.

In manufacturing the mold 21, as shown in FIG. 2A and FIG. 2B, first a curable resin used to form the mold is coated or injected onto a surface of the base plate 20, on which the projections 20a corresponding to the shapes of the waveguide cores are formed. Then, the curable resin is cured after the drying process is carried out as occasion demands. Then, the cured curable resin is released from the base plate 20. Thus, as shown in FIG. 2C, the mold structure having recesses 21a corresponding to projection shapes of the waveguide cores can be manufactured.

As the curable resin for formation of the mold, a liquid silicon rubber that is rubbery after the cure, for example, can be employed. As the liquid silicon rubber, particularly preferably a liquid dimethylsiloxane rubber, for example, should be employed from aspects of adhesion, releasability, dimensional stability, strength, hardness, etc. In the mold 21 using such liquid silicon rubber, a deformation of the recess structure, and the like can be prevented. The shapes of the waveguide cores on the base plate 20 can be stably copied with high precision, and also a mixture of bubbles can be reduced. Also, even though a sectional shape of the recess 21a of the mold 21 is extremely small such as about 10×10 μm, for example, the curable resin for formation of the waveguide core can be filled instantly into the recesses 21a of the mold 21 by utilizing the capillary phenomenon of the curable resin.

(Step of Manufacturing the Waveguide Core on the Lower Clad Film Substrate)

In the step of manufacturing the waveguide cores 12 on the lower clad film substrate 11 (lower substrate 11) formed of the polymer film material, as shown in FIG. 2C to FIG. 2F, first the lower clad film substrate 11 is adhered to the mold 21, and then the curable resin for formation of the waveguide cores is filled into the recesses 21a of the mold 21 to which the lower clad film substrate 11 is tightly contacted. Then, the filled curable resin for formation of the waveguide core is cured by a heat, a light, or the like. Then, the mold 21 is released from the curable resin for formation of the waveguide core. In this step, it is preferable that the curable resin for formation of the waveguide cores should be filled into the recesses 21a of the mold 21 by the capillary phenomenon, for example. Also, in order to accelerate the filling of the curable resin into the recesses 21a of the mold 21 by utilizing the capillary phenomenon, it is desirable that the overall suction system should be reduced to about 0.1 to 200 Pa by providing a suction port (not shown) in a predetermined position that communicates with the recesses 21a of the mold 21 respectively, for example.

It is of course that the waveguide cores 12 on the lower clad film substrate 11 can be manufactured by the substantially same manufacturing method as the manufacturing technology in JP-A-2004-29507, JP-A-2004-86144 and JP-A-2004-109927 that the applicant of the application has proposed in advance. But the present invention is not limited to this method. For example, the manufacturing method of the waveguide cores 12 by means of the direct exposure method, the etching method, or the like, for example, can be employed. In the present invention, preferably the waveguide cores 12 should be manufactured on the lower clad film substrate 11 by using the manufacturing technology in JP-A-2004-29507, JP-A-2004-86144 and JP-A-2004-109927 from aspects such that the number of manufacturing steps can be reduced, a production cost can be reduced, and the projections of the waveguide cores 12 can be formed directly on the flexible polymer film substrate.

As the curable resin for formation of the waveguide cores, the resin having a radiation curability, an electron curability, a thermosetting property, or the like, for example, is preferable. Particularly preferably the ultraviolet curable resin, the thermosetting resin, or the like should be employed. As the ultraviolet curable resin or the thermosetting resin, ultraviolet curable or thermosetting monomer, oligomer, mixture of the monomer and the oligomer, or the like, for example, can be employed. As the ultraviolet curable resin, epoxy, polyimide, acrylic ultraviolet curable resin, or the like, for example, can be employed preferably.

(Step of Manufacturing the Uncured Thin Film Clad on the Upper Clad Film Substrate)

In the step of manufacturing the uncured clad thin film layer 14a (thin film clad 14a) on the upper clad film substrate 13 (upper substrate 13) formed of the polymer film material, as shown in FIG. 2G and FIG. 2H, first the uncured clad thin film layer 14a is manufactured by dropping the uncured resin for the clad on the upper clad film substrate 13 by a proper quantity. The uncured clad thin film layer 14a can be formed by the spin coating method, for example.

As the resin for formation of the clad, various resin materials such as the radiation curable resin, the electron curable resin, the thermosetting resin, and the like, for example, can be employed. The ultraviolet curable resin, the thermosetting resin, or the like is particularly preferable. As the ultraviolet curable resin or the thermosetting resin, ultraviolet curable or thermosetting monomer, oligomer, mixture of the monomer and the oligomer, or the like, for example, can be employed. As the ultraviolet curable resin, epoxy, polyimide, acrylic ultraviolet curable resin, or the like, for example, can be employed preferably. In order to cure the ultraviolet curable resin, an ultraviolet lamp, an ultraviolet LED, a UV irradiating system, or the like can be employed. Also, in order to cure the thermosetting resin, the heating in the oven, or the like may be employed.

As the lower clad film substrate 11 and the upper clad film substrate 13, preferably the film material having flexibility should be employed. When the ultraviolet curable resin is used as the resin for formation of the waveguide core and the thin film clad, it is important that the material whose transparency to an ultraviolet range is high should be selected. It is preferable that a difference in a refractive index between the clad film substrates 11, 13 and the thin film clad 14 should be set 0.02 or less. More preferably the same refractive index should be selected or the difference in the refractive index should be set within 0.005. In contrast, when the clad base on which the thin film clad is coated is employed as the base, a flatness of the base can be improved, and also the base formed of the material that is inferior in transparency and that is not limited in a refractive index can be employed.

(Step of Manufacturing the Thin Film Clad on the Side Surface of the Waveguide Core and the Cavity)

In the step of manufacturing the clad 14 on the side surface of the waveguide core 12 and the cavity 15 passing along the waveguide core 12 between the lower clad film substrate 11, the upper clad film substrate 13, and the clads 14, as shown in FIG. 2I to FIG. 2K, at first the uncured clad thin film layer 14a on the upper clad film substrate 13 is glued onto the waveguide cores 12 on the lower clad film substrate 11. The uncured clad thin film layer 14a is flown onto side surfaces of the waveguide cores 12 by utilizing a migration of the resin while this structure is kept as it is for several minutes in this state. After several minutes have passed, the uncured clad thin film layer 14a is cured by an ultraviolet ray, a heat, or the like. Thus, the clads 14 on the side surfaces of the waveguide cores 12 and the cavities 15 can be formed.

(Step of Filling/Curing the Curable Resin in the Cavity)

In the step of filling/curing the curable resin serving as the closing member 16 in the cavity 15, the uncured curable resin is dropped into the cavities 15, then this curable resin is filled in desired positions in the cavities 15 by the capillary phenomenon and/or the vacuum suction, and then the curable resin filled in the cavities 15 is cured by a heat, a light, or the like. FIG. 3A shows a state that the curable resin is filled/cured in opening end portions of the cavities 15 on one side, and FIG. 3B shows a state that the curable resin is filled/cured in opening end portions of the cavities 15 on both sides. Also, the uncured curable resin can be diffused naturally toward the suction port side by utilizing the capillary phenomenon. Also, the uncured curable resin can be diffused forcedly toward the suction port side by applying the vacuum suction from the suction port side. As this curable resin, the material different from the clad 14 can be selected. It is preferable from the aspect that the coupling to other devices can be made easy that the material whose rigidity is enhanced after the curing should be selected to reinforce the end portion. Also, a refractive index of the curable resin is not limited.

When the curable resin is filled/cured in the opening end portions of the cavities 15 on both sides, it is preferable that, as shown in FIG. 3B, a through hole 17 should be formed in the lower clad film substrate 11 or the upper clad film substrate 13 in a position corresponding to the cavity 15 by the laser beam machining, or the like. This through hole 17 acts as an air vent and a suction port in the capillary phenomenon and/or the vacuum suction. Preferably the through holes 17 should be closed after the curable resin is filled/cured in the opening end portions of the cavities 15. Since the through holes 17 are closed after the curable resin is filled/cured, it can be prevented that the flexibility of the optical waveguide as the desired end is reduced and also it can be prevented that breakage, deformation, etc. of peripheral portions of the through holes 17 occur when the bending operation of the optical waveguide 10 is repeated. It is preferable that the through holes 17 should be formed in respective portions that are separated from the portions in which the optical waveguide 10 is often subjected to the bending operation.

(Step of Cutting the End Portion of the Optical Waveguide)

The flexible polymer optical waveguide 10 is formed by cutting orthogonally or obliquely both end surfaces of the optical waveguide in the longitudinal direction by the dicing saw, or the like. It is of course that the method of cutting both end surfaces of the optical waveguide is not limited to the cutting method using the dicing saw.

Second Embodiment (Configuration of Optical Communication Module)

Figure 4:
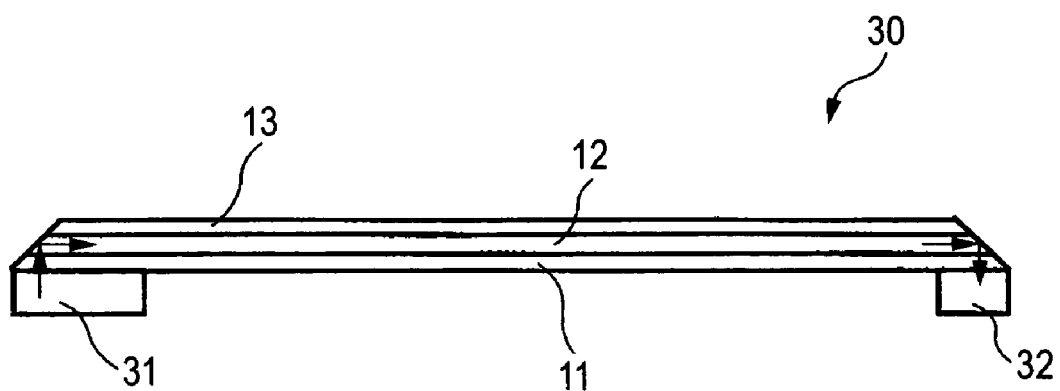
FIG. 4 is a conceptual view showing a configuration of an optical communication module according to a second embodiment of the present invention.

FIG. 4 shows a configurative example of an optical communication module according to a second embodiment of the present invention. FIG. 4 is a conceptual view showing a configuration of the optical communication module. In FIG. 4, the same member names and the same reference symbols are affixed to the substantially same members as those in the first embodiment. Therefore, detailed explanation regarding these members will be omitted herein.

In FIG. 4, a reference numeral 30 denotes an optical communication module equipped with the flexible polymer optical waveguide 10 as the first embodiment. This optical communication module 30 has the array structure in which the waveguide cores 12 and the cavities 15 constituting the optical wiring pattern are extended mutually. The curable resin shown in FIG. 3B is filled/cured in the opening end portions of the cavities 15. A light emitting portion consisting of a single light emitting element 31 (surface emitting laser array 31) is provided to one end portion side of the polymer optical waveguide 10, and a light receiving portion consisting of a single light receiving element 32 (photodiode array 32) is provided to the other end portion side. Both end surfaces of the polymer optical waveguide 10 are shaped into inclined mirror surfaces that are alternately obliquely inclined at an inclination angle of almost 45 degree to the light traveling direction.

(Operation of the Optical Communication Module)

As shown in FIG. 4, the light signal that is emergent from the surface emitting laser array 31 is passed through the lower clad film substrate 11 and is incident on the polymer optical waveguide 10. The incident light signal is reflected by the inclined mirror surface and propagates along the inside of the polymer optical waveguide 10. The light signal is reflected again by the other inclined mirror surface to change the propagation direction, and is incident on the photodiode array 32 through the lower clad film substrate 11. This light signal is converted into an electric signal, and then is transmitted to the outside via an electric parts (not shown). In this manner, the surface emitting laser array 31 and the photodiode array 32 can be optically coupled to each other.

Third Embodiment (Configuration of Optical Communication Module)

Figure 5:
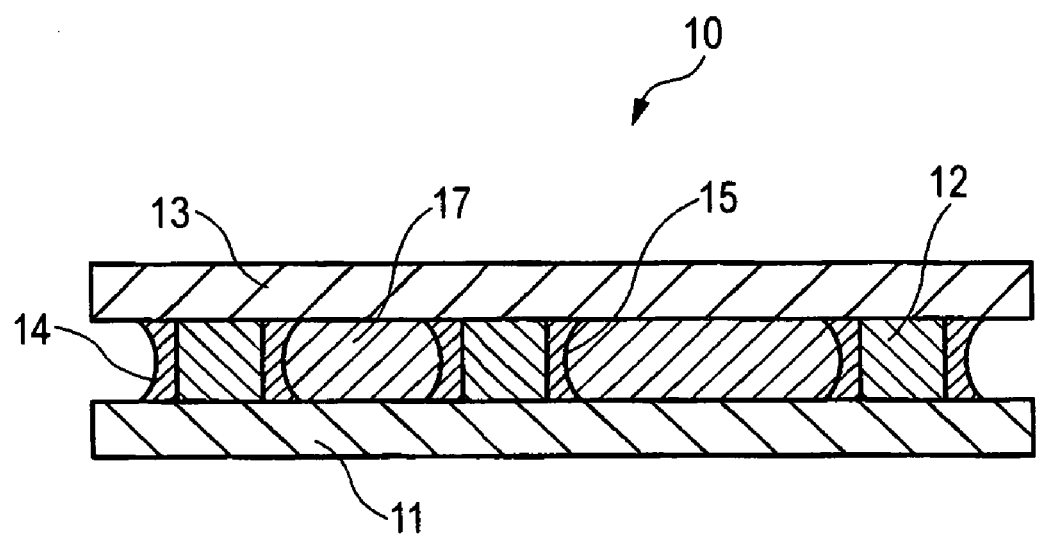
FIG. 5 is a sectional view showing schematically a configurative example of an optical waveguide according to a third embodiment of the present invention.
Figure 6G:
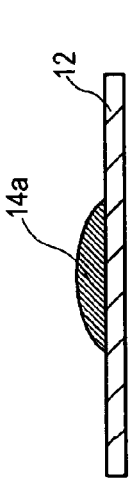
FIGS. 6A to 6L are process views showing conceptually steps of manufacturing the optical waveguide according to a third embodiment of the present invention.
Figure 6H:
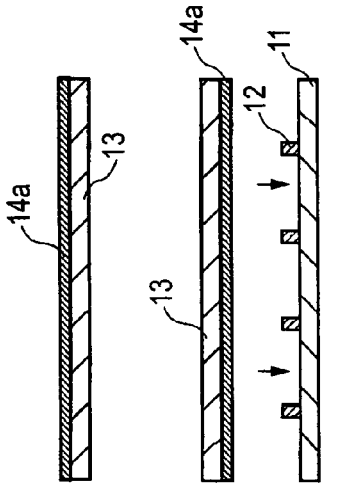
Figure 6I:
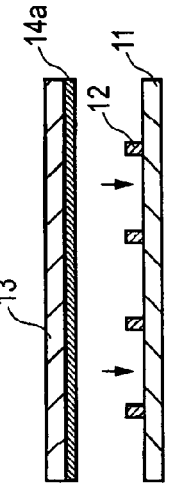
Figure 6J:
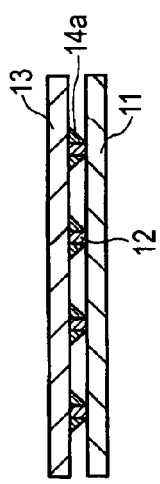
Figure 6K:
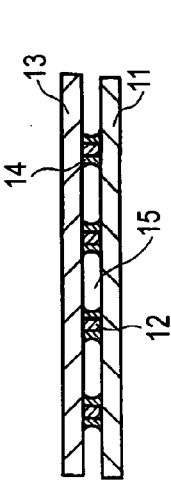
Figure 6L:
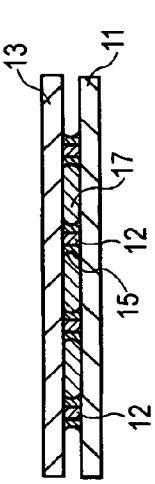
Figure 6A:
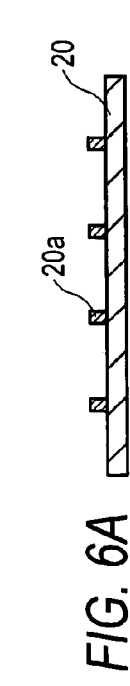
Figure 6B:
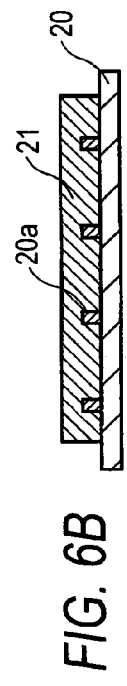
Figure 6C:
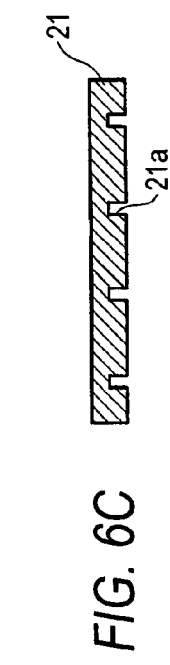
Figure 6D:
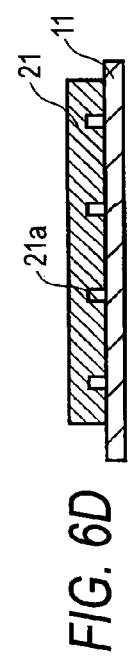
Figure 6E:
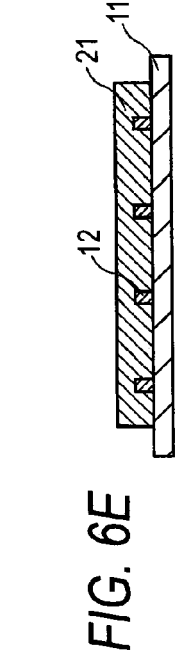
Figure 6F:
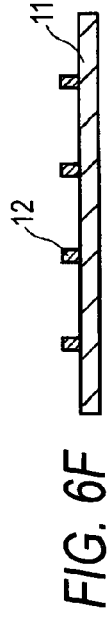

FIG. 5 shows a configurative example of an optical communication module according to a second embodiment of the present invention. FIG. 5 is a conceptual view showing a configuration of the optical communication module. In FIG. 5, the same member names and the same reference symbols are affixed to the substantially same members as those in the first embodiment. Therefore, detailed explanation regarding these members and constructions will be omitted herein.

In FIG. 5, a reference symbol 10 denotes a configurative example of the optical waveguide having the electric wire. As shown in FIG. 5, a basic configuration of the optical waveguide 10 includes a lower substrate 11 serving as a cladding layer, waveguide cores 12 formed on the lower substrate 11, an upper substrate 13 opposed to the lower substrate 11 to put the waveguide cores 12 between them and serving as a cladding layer, thin film clads 14 formed on side surfaces of the waveguide cores 12 respectively, cavities 15 formed to pass between the opposing clads 14, and conductive layer 17 formed in the cavities 15. The lower substrate 11 and the upper substrate 13 are formed of a film member, a sheet member, or the like, for example, to have a rectangular shape. The waveguide cores 12 and the cavities 15 are formed to have an array structure in which they are arranged at a predetermined array interval mutually. The waveguide cores 12 in this array structure are extended in the light traveling direction at different array intervals mutually.

The conductive layer 17 in this array structure is electric wire constituting a conductive material and is formed along the waveguide cores 12 from one end surface to the other end surface in the light traveling direction of the cavities 15. A sectional shape of the conductive layer 17 to the light traveling direction is shaped into a substantially rectangular shape, and a width of the sectional shape is set to a different width dimension respectively. A height of the conductive layer 17 is substantially equal to a height of the waveguide core 12. In this optical waveguide 10, the waveguide cores 12 constituting the optical wiring pattern and the conductive layer 17 constituting the wiring pattern constitute a waveguide film having function of optical transmission, electronic signal, electric power supply and GND (Ground) wire, or so like.

(Method of Manufacturing the Optical Waveguide)

The optical waveguide 10 constructed as above according to the third embodiment is manufactured effectively by the substantially same manufacturing method as the present invention shown in FIGS. 6A to 6L as follows. A process having a work different from the first embodiment of the present invention is only explained.

(Step of Filling/Curing the Conductive Material in the Cavity)

In the step of filling/curing the conductive material serving as the conductive layer 17 in the cavity 15, the uncured conductive material is dropped into the cavities 15, then this conductive material is filled in desired positions in the cavities 15 by the capillary phenomenon and/or the vacuum suction, and then the conductive material filled in the cavities 15 is cured by a heat, a light, or the like. The uncured curable resin can be diffused naturally toward the suction port side by utilizing the capillary phenomenon. Also, the uncured curable resin can be diffused forcedly toward the suction port side by applying the vacuum suction from the suction port side. FIG. 3A shows a state that the conductive material is filled/cured in the cavities 15 on one side. If the heat treatment is needed in the step of filling/curing the conductive material, it is preferred that the curable condition of the conductive material is 200° C. or less. More preferably, the curable condition is 150° C. or less, furthermore preferably, the curable condition is 100° C. or less. In view of avoiding the separation generated by the thermal expansion coefficient difference between the lower clad film substrate 11, the waveguide cores 12, the upper clad film substrate 13 and the clad 14, the lowering cure temperature of the conductive material is desirable. Also, it is preferred that the cure time is shorter. The paste of metal, for example, aluminum, silver, gold and nickel, or the like, the alloy thereof and the transparent resin having conductivity can use as the conductive layer 17. Particularly preferably the material containing the polymer is preferable. Since the material containing the polymer is employed, good adhesive and excellent flexibility is rendered to the lower clad film substrate 11, the upper clad film substrate 13 and the clad 14.

Fourth Embodiment (Configuration of Optical Communication Module)

Figure 7:
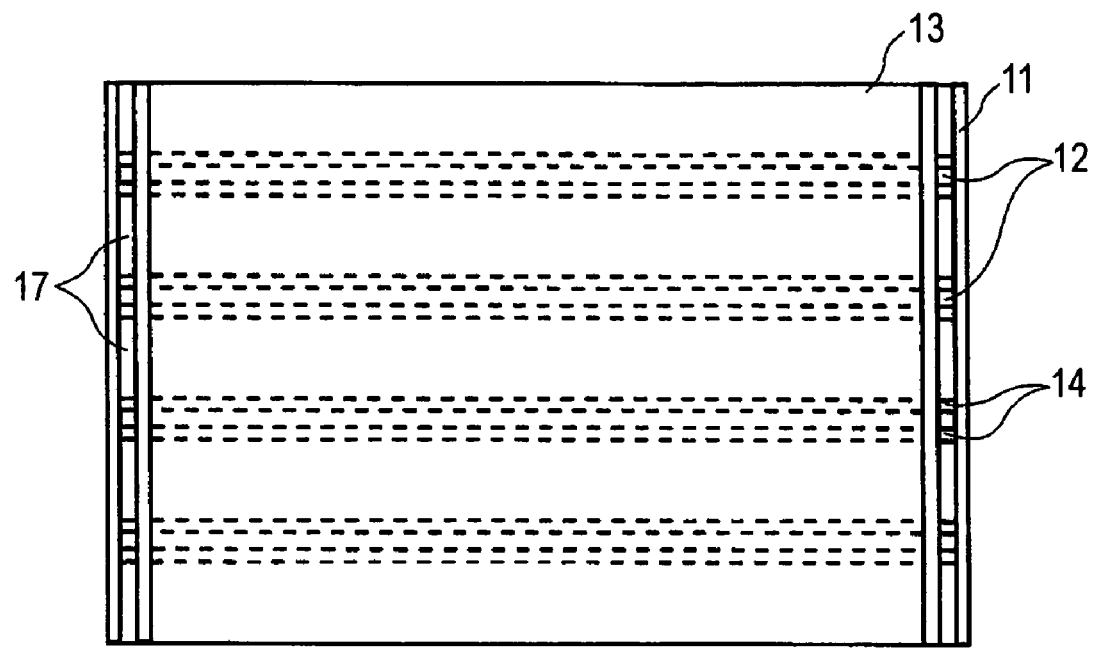
FIG. 7 is a conceptual view showing a configuration of an optical communication module according to a second embodiment of the present invention.

FIG. 7 shows a configurative example of an optical communication module according to a second embodiment of the present invention. FIG. 7 is a conceptual view showing a configuration of the optical communication module. In FIG. 7, the same member names and the same reference symbols are affixed to the substantially same members as those in the third embodiment. Therefore, detailed explanation regarding these members and constructions will be omitted herein.

In FIG. 7, a reference numeral 30 denotes an optical communication module equipped with the flexible polymer optical waveguide 10 as the third embodiment. This optical communication module 30 has the array structure in which the waveguide cores 12 constituting the optical wiring pattern and the conductive layer 17 constituting the conductive pattern are extended mutually. The optical communication module 30 is connected to the electronics and can perform the communication sending and receiving the data by using the conductive layer 17 as the transmission path, power feeding to the optical transmission device, and the communication sending and receiving the data by using the waveguide core 12. The electronics device includes, for example, the liquid crystal display screen, the liquid crystal projector, the plasma display panel and the printer, etc.

EXAMPLES

Particular Examples of the present invention will be explained with reference to FIGS. 2A to 2L hereinafter.

Example 1

A thick film resist (SU-8 manufactured by Microchemical Co., Ltd.) was coated on the surface of the silicon substrate by the spin coating method, and then was pre-baked at 80° C. Then, the projections corresponding to the shapes of the waveguide cores were formed on the silicon substrate by exposing/developing the thick film resist on the silicon substrate through the photomask. Then, the base plate used to manufacture the waveguide core was manufactured by post-baking the projections on the silicon substrate at 120° C. (see FIG. 2A).

Then, a remover was coated on the base plate, and then a thermosetting dimethylsiloxane resin (SYLGARD 184 manufactured by Dow Corning Asia Ltd.) was poured and kept as it is for a predetermined time. Then, a vacuum degassing was carried out for about 10 minute, and then the resin was solidified by heating the structure for 30 minute at 120° C. (see FIG. 2B). Then, the mold having the recesses corresponding to the shapes of the waveguide cores (mold thickness 5 mm) was manufactured by releasing the base plate. Then, a filling port and a suction port were formed by opening a hole of 3 mm diameter in both end portions that communicate with the recesses of the mold respectively, and thus the mold was manufactured (see FIG. 2C). In this mold, four waveguide cores (recesses) were formed in parallel mutually, a size of a section of the waveguide core was 50×50 μm, and an interval between the waveguide cores was set to 250 μm.

Then, the resultant mold and the lower film substrate (Arton film manufactured by JSR Co., Ltd., a refractive index 1.51) serving as the lower clad film and having a film thickness of 100 μm were glued together (see FIG. 2D). Then, an ultraviolet curable resin (manufactured by JSR Co., Ltd., a refractive index 1.56 after the curing) was filled sufficiently in the filling port of the mold, and then was sucked via the suction port by a suction pump. Thus, the ultraviolet curable resin was filled in the recesses of the mold (see FIG. 2E). Then, the ultraviolet curable resin filled in the recesses of the mold was cured by irradiating an ultraviolet ray of 50 mW/cm$^2$ through the mold for 5 minutes. Then, the waveguide cores were manufactured on the lower film substrate by releasing the mold (see FIG. 2F).

Then, the ultraviolet curable resin (manufactured by JSR Co., Ltd., a refractive index 1.51 after the curing) was dropped onto the upper film substrate serving as the upper clad film and having a film thickness of 100 μm (Arton film manufactured by JSR Co., Ltd., a refractive index 1.51) by a proper quantity (see FIG. 2G). Then, the uncured thin film cladding layer of 40 μm thickness was formed by the spin coating method (see FIG. 2H). Then, the uncured thin film cladding layer coated on the upper film substrate was pasted onto the waveguide cores on the lower film substrate (see FIG. 2I). Then, the resultant structure was kept as it is for several minutes until the uncured thin film cladding layer migrated to the side surface portions of the waveguide cores on the lower film substrate whereas remaining portions are maintained as the cavities (see FIG. 2J). Then, the uncured thin film cladding layer was cured by irradiating an ultraviolet ray of 50 mW/cm$^2$ for 15 minutes through the upper film substrate (see FIG. 2K). Finally, the optical waveguide was cut by the dicing saw to form the end portion of the waveguide core and was set to a waveguide length of 60 mm. With the above steps, the cavities whose height is 50 μm and whose width is 200 μm were formed between the waveguide cores to pass along them and thus the flexible polymer optical waveguide was obtained.

A center portion of the manufactured polymer optical waveguide was pasted onto a cylindrical jig of 5 mm radius and the polymer optical waveguide was bent by 90 degree while using the center portion as a fulcrum, and then a loss measurement was made. As a result, it has been confirmed that an insertion loss is 1.0 dB and this is at a practical level.

Example 2

According to the similar procedures to those in Example 1, the mold that can manufacture four waveguide cores a sectional size of each of which is 50×50 μm and an interval between which is set to 250 μm, 500 μm, and 750 μm respectively was manufactured, and the cavities were formed along the waveguide cores to pass through the mold. As a result, the flexible polymer optical waveguide having three cavities a height of which is 50 μm and a width of which is about 200 μm, 450 μm, and 700 μm respectively was obtained.

Example 3

According to the similar procedures to those in Example 1, the flexible polymer optical waveguide having four waveguide cores, a sectional size of each of which is 50×50 μm, an interval of which is 250 μm, and a length of which is 60 mm, and three cavities was manufactured. Then, the ultraviolet curable resin was filled from one opening ends of the cavities to a depth of 10 mm by utilizing the capillary phenomenon, and then was cured by irradiating an ultraviolet ray of 50 mW/cm$^2$ immediately. Then, the through hole of 100 μm diameter were formed in respective portions corresponding to the cavities of the polymer optical waveguide by the laser beam machining to open the air vent. Then, the ultraviolet curable resin was filled from the other opening ends of the cavities to a depth of 20 mm by utilizing the capillary phenomenon, and then was cured by irradiating the ultraviolet ray of 50 mW/cm$^2$ immediately. Finally, the optical waveguide was cut by the dicing saw to form the end portions of the waveguide cores. With the above steps, the polymer optical waveguide that has the cavities between the waveguide cores and has partially the flexibility by filling the curable resin into the opening ends of the cavities on both sides to have different lengths was obtained.

Example 4

According to the similar procedures to those in Example 1, the cavities were formed between the waveguide cores, the lower substrate, and the upper substrate (See FIGS. 6A to 6K). Then, the silver paste was delivered by drops into one opening end portion of the cavity, and the silver paste is filled in the cavity by the capillary phenomenon generated by aspirating (600 mPa) the other opening end portion served as an inlet. And then, the silver paste was hardened by heating in the electric oven for one hour at 150° C. Finally, the optical waveguide was cut by the dicing saw to form the end portion of the waveguide core and was set to a waveguide length of 60 mm. With the above steps, the flexible polymer optical waveguide having the conductive layer a height of which is 50 μm and a width of which is about 200 μm, the conductive layer being formed along between the waveguide cores, was obtained. After measure the propagation loss of the flexible polymer optical waveguide, the propagation loss of the flexible polymer optical waveguide is 0.1 dB/cm. Then, it is confirmed that the conductive layer is conduction state by the electric characterization.

Example 5

According to the similar procedures to those in Example 1, the mold that can manufacture four waveguide cores a sectional size of each of which is 50×50 μm and an interval between which is set to 250 μm, 500 μm, and 750 μm respectively was manufactured, and the conductive layers were formed along the waveguide cores to pass through the mold. As a result, the flexible polymer optical waveguide having three conductive layers a height of which is 50 μm and a width of which is about 200 μm, 450 μm, and 700 μm respectively was obtained.

In this case, the optical waveguide and the method of manufacturing the same, and the optical communication module according to the present invention are not limited to above embodiments and Examples. Various changes of design can be applied within a scope that does not depart from the gist of the invention.

The present invention can be used in an optical circuit, an optical branching filter and an optical coupler, an optical switch, etc. in propagating a light signal, for example, a connector of an optical fiber, a splitter, and the like.

What is claimed is:

1. An optical waveguide comprising:
   a first optical waveguide end;
   a second optical waveguide end;
   a lower substrate;
   a waveguide core formed on the lower substrate, the waveguide core being capable of transmitting light in a light traveling direction from the first optical waveguide end to the second optical waveguide end;
   a clad formed to surround a periphery of the waveguide core; and
   an upper substrate opposing the lower substrate,
   wherein the clad, the lower substrate and the upper substrate surround a cavity that extends along the clad in the light traveling direction,
   the cavity is not filled and cured with a closing member, and
   the cavity is formed to pass alone the waveguide core from one end surface to the other end surface in the light traveling direction.

2. An optical waveguide as claimed in claim 1, wherein the waveguide core and the cavity are formed in an array structure extending mutually.

3. An optical waveguide as claimed in claim 2, wherein sectional widths of a plurality of cavities in the array structure taken perpendicular to the light traveling direction are different from each other.

4. An optical waveguide as claimed in claim 1, which comprises:
   a closing member that comprises a curable resin and is filled and cured in at least one opening end portion of the cavity.

5. An optical waveguide as claimed in claim 4,
   wherein
   the closing member is filled and cured at predetermined positions in opening end portions of the cavity on both sides, and
   distance between filling start positions and filling end positions of the closing member are different from each other.

6. An optical waveguide as claimed in claim 4, wherein the closing member comprises a material different from the clad.

7. An optical waveguide as claimed in claim 4, wherein the closing member comprises a polymer material.

8. An optical waveguide as claimed in claim 1,
   wherein
   the lower substrate and the upper substrate comprise film materials having one of a refractive index equal to a refractive index of the clad and a refractive index difference of 0.02 or less, and have a flexibility.

9. An optical waveguide as claimed in claim 1, wherein the lower substrate and the upper substrate comprise polymer film materials.

10. An optical waveguide as claimed in claim 1, wherein the clad comprises a curable polymer material.

11. An optical waveguide as claimed in claim 1, which comprises:
a cladding layer that comprises at least one of opposing inner wall surfaces of the lower substrate and the upper substrate.

12. A method of manufacturing the optical waveguide of claim 1, comprising:
forming the waveguide core on the lower substrate, the waveguide core being capable of transmitting light in a light traveling direction from the first optical waveguide end to the second optical waveguide end;
forming the clad to surround a periphery of the waveguide core; and
forming the upper substrate opposing the lower substrate.

13. The method of claim 12, further comprising:
filling and curing a closing member comprising a curable resin in the cavity.

14. The method of claim 13,
wherein
the filling and curing of the closing member comprises filling the closing member at a predetermined position of the cavity by at least one of a capillary phenomenon and a vacuum suction.

15. The method of claim 13, further comprising:
forming a through hole in a portion of one of the lower substrate and the upper substrate corresponding to the cavity, the through hole being for at least one of a capillary phenomenon and a vacuum suction,
wherein
the filling and curing of the closing member comprises:
filling the closing member to a predetermined depth in one opening end portion of the cavity, and curing the closing member by one of a heat and a light; and
filling the closing member to a predetermined depth in other opening end portion of the cavity, and curing the closing member by one of a heat and a light.

16. The method of claim 12, further comprising
curing the clad;
filling a conductive material; and
hardening the conductive material.

17. The method of claim 16,
wherein
the filling of the conductive material comprises filling the closing member in the cavity by at least one of a capillary phenomenon and a vacuum suction.

18. The method of claim 16,
wherein
the forming of the waveguide core comprises forming the waveguide core extended at a same array interval, and
the conductive material is formed to have an array width corresponding to the array interval of the waveguide core.

19. The method of claim 16,
wherein
the forming of the waveguide core comprises forming the waveguide core extended at a different array interval, and
the conductive material is formed to have a cross-section corresponding to the array interval of the waveguide core.

20. The method of claim 16, wherein the upper substrate and the lower substrate comprise polymer film materials.

21. The method of claim 16, further comprising:
preliminarily forming the clad on the upper substrate and the lower substrate before the forming of the waveguide core.

22. The method of claim 16, wherein the clad comprises a curable polymer material.

23. The method of claim 16, wherein the conductive material comprises a material containing a polymer material having a curable property.

24. The method of claim 16,
wherein
the forming of the waveguide core comprises:
preparing a mold comprising a recess that corresponds to a projection of the waveguide core;
pasting the mold onto the lower substrate;
dropping core material via the filling port of the recess, and filling the dropped core material by at least one of a capillary phenomenon and a vacuum suction;
curing the filled core material by one of a heat and a light; and
separating the mold from the lower substrate.

25. An optical communication module comprising:
a light emitting portion that guides an incident light into the waveguide core of the optical waveguide set forth in claim 1; and
a light receiving portion that receives an emergent light from the waveguide core.

26. The optical waveguide of claim 1,
wherein the cavity is capable of having an index of refraction greater than a waveguide core index of refraction.

* * * * *